April 3, 1962 T. N. TENGSATER 3,028,328
NUCLEAR REACTOR EXPERIMENTAL FACILITY
Filed April 4, 1958 6 Sheets-Sheet 3
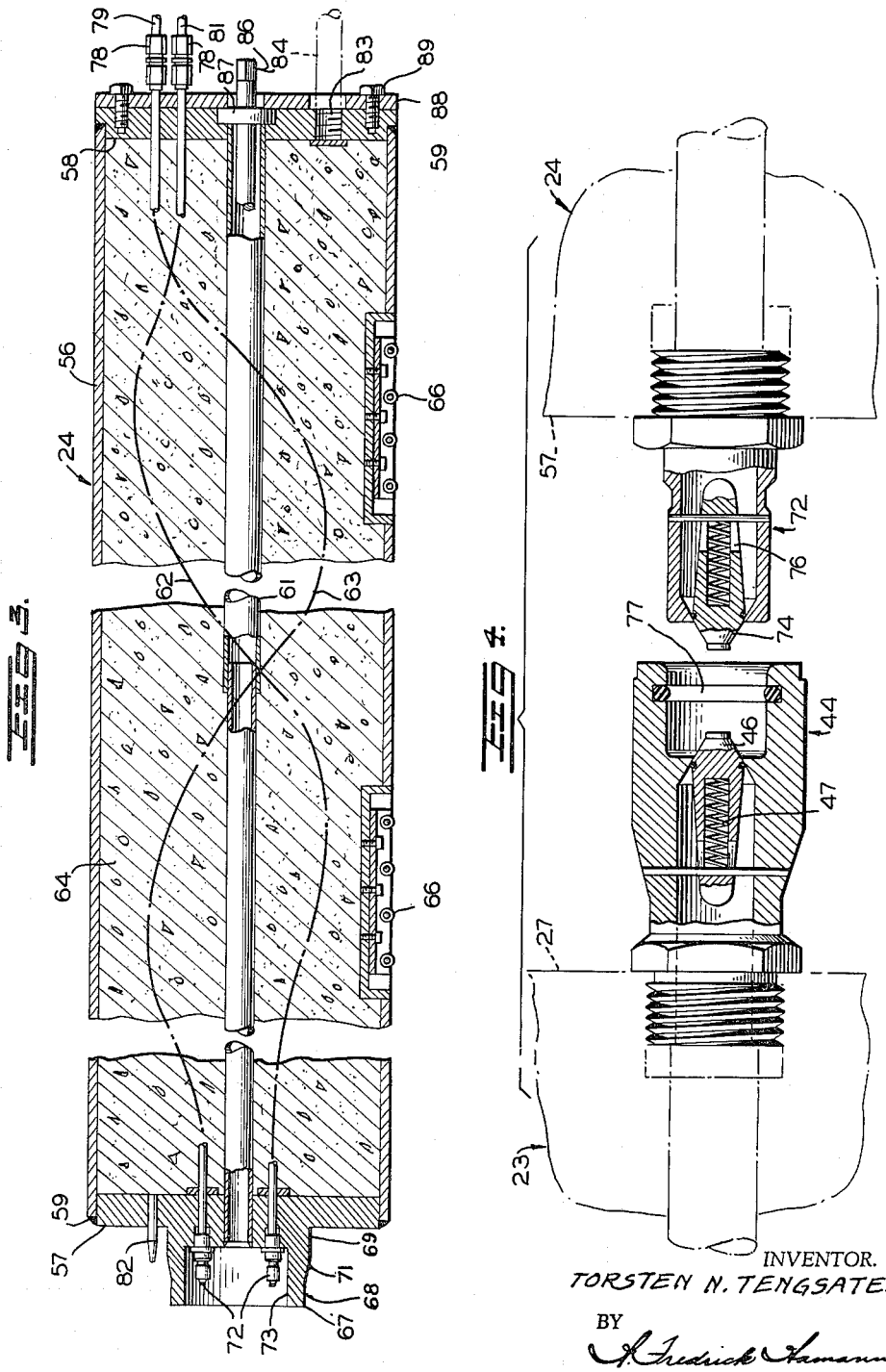
INVENTOR.
TORSTEN N. TENGSATER
BY
A. Fredrick Hamann
ATTORNEY

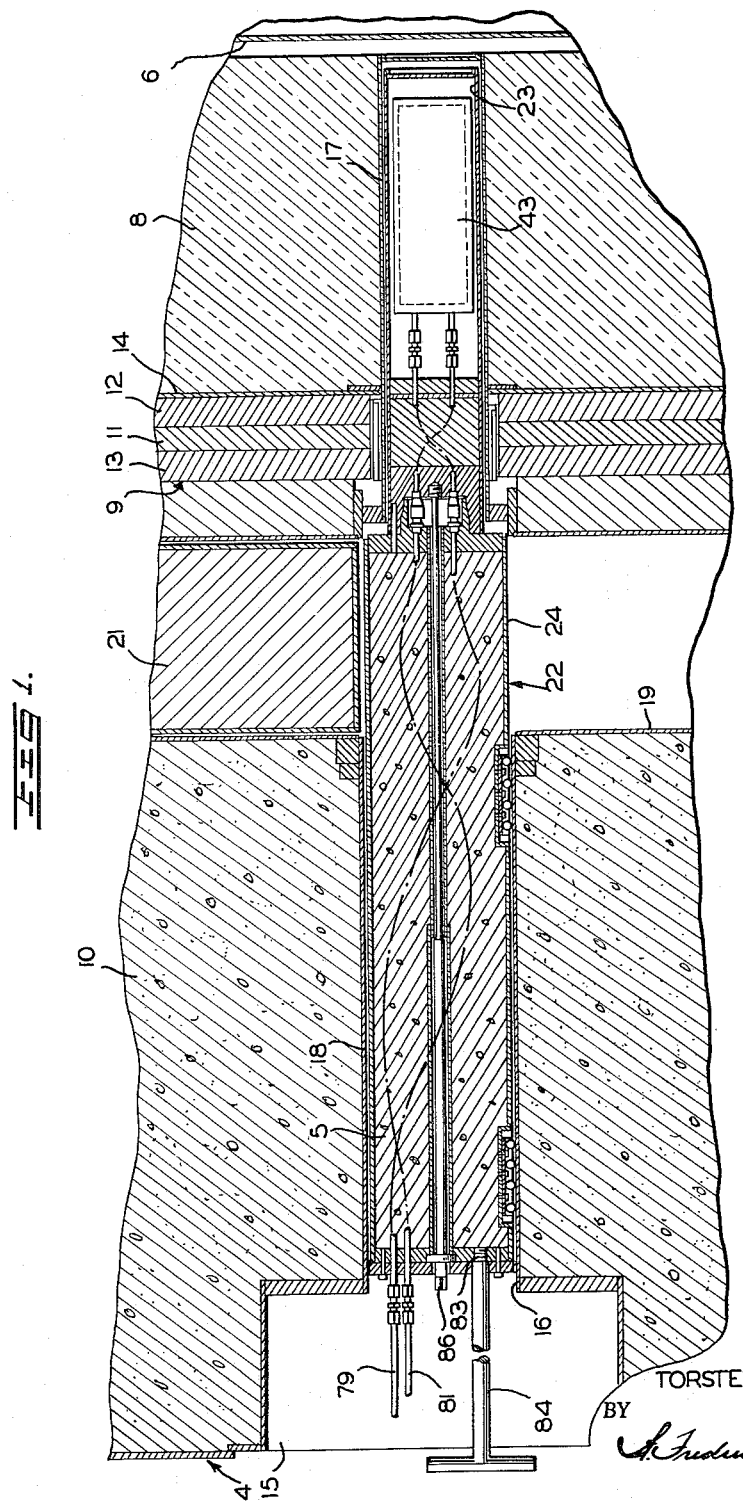

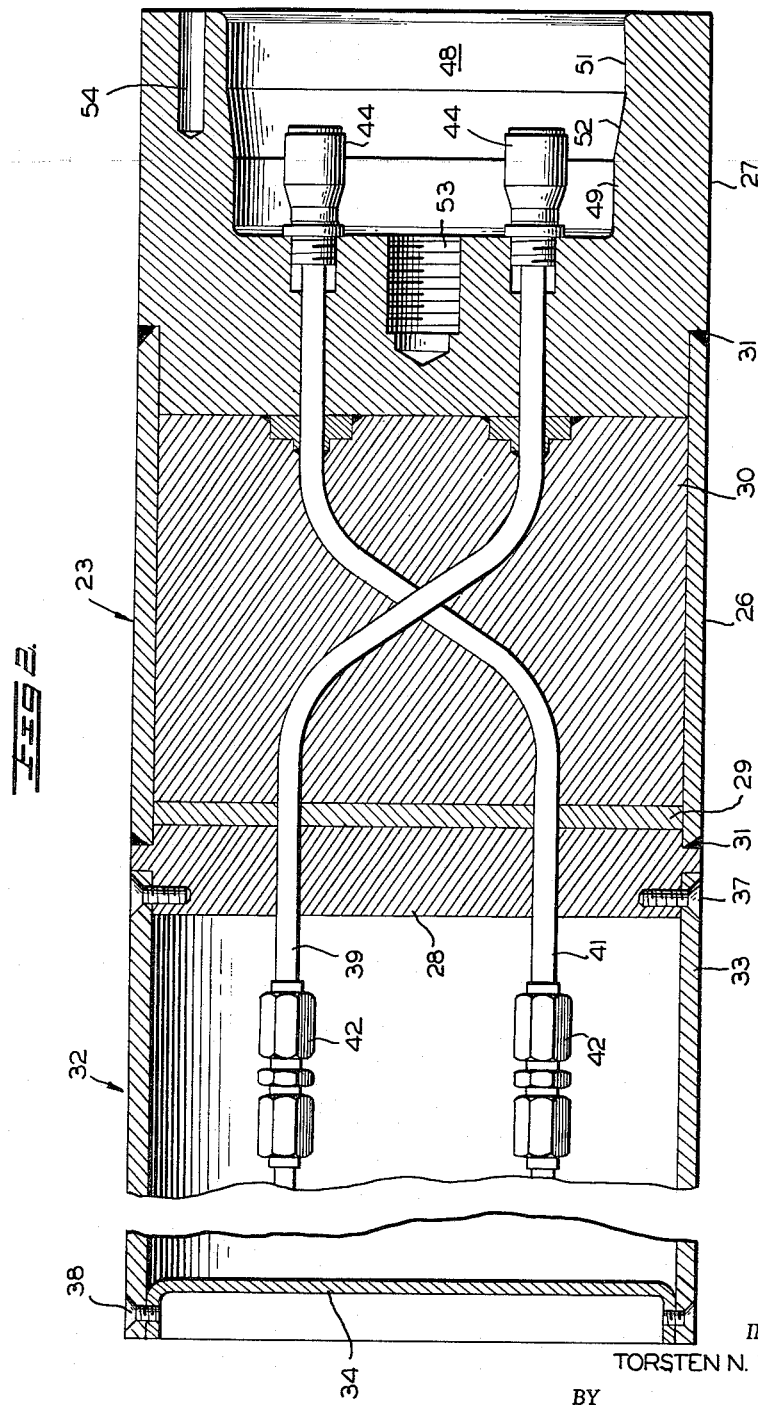

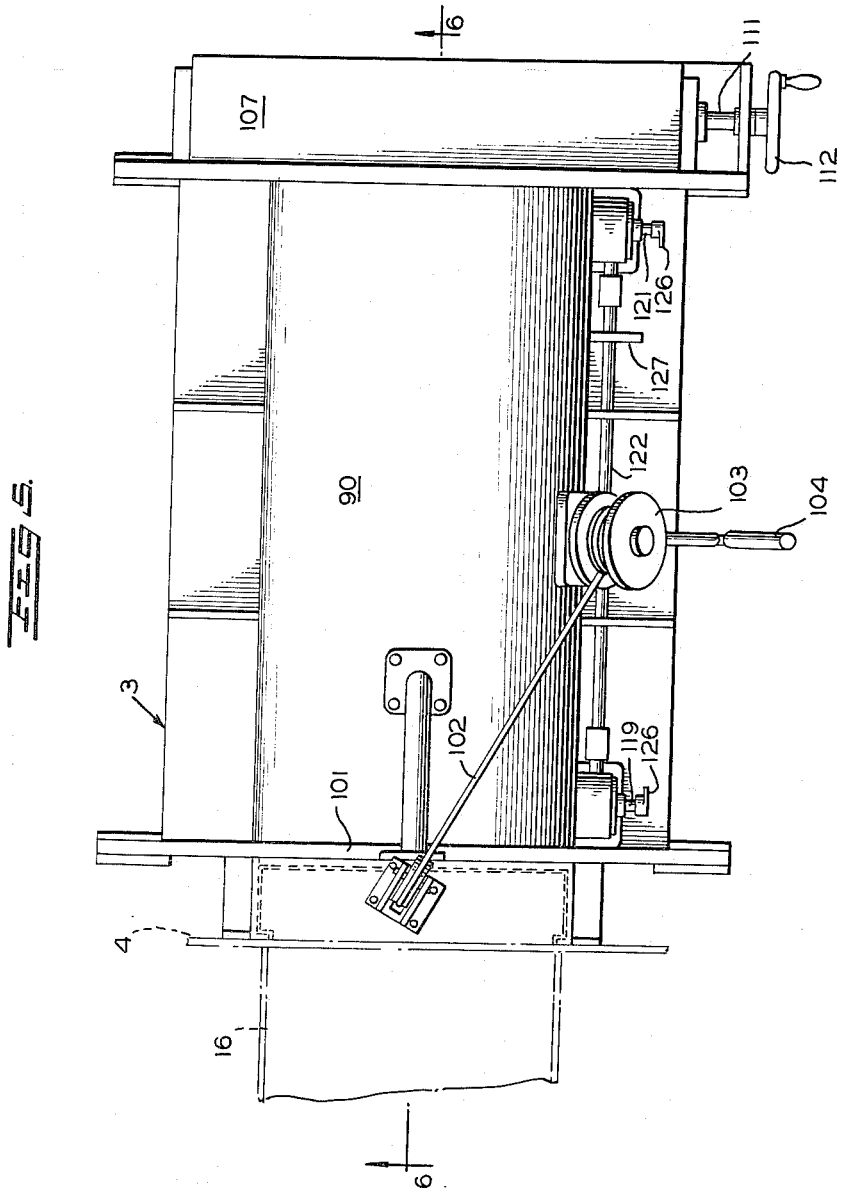

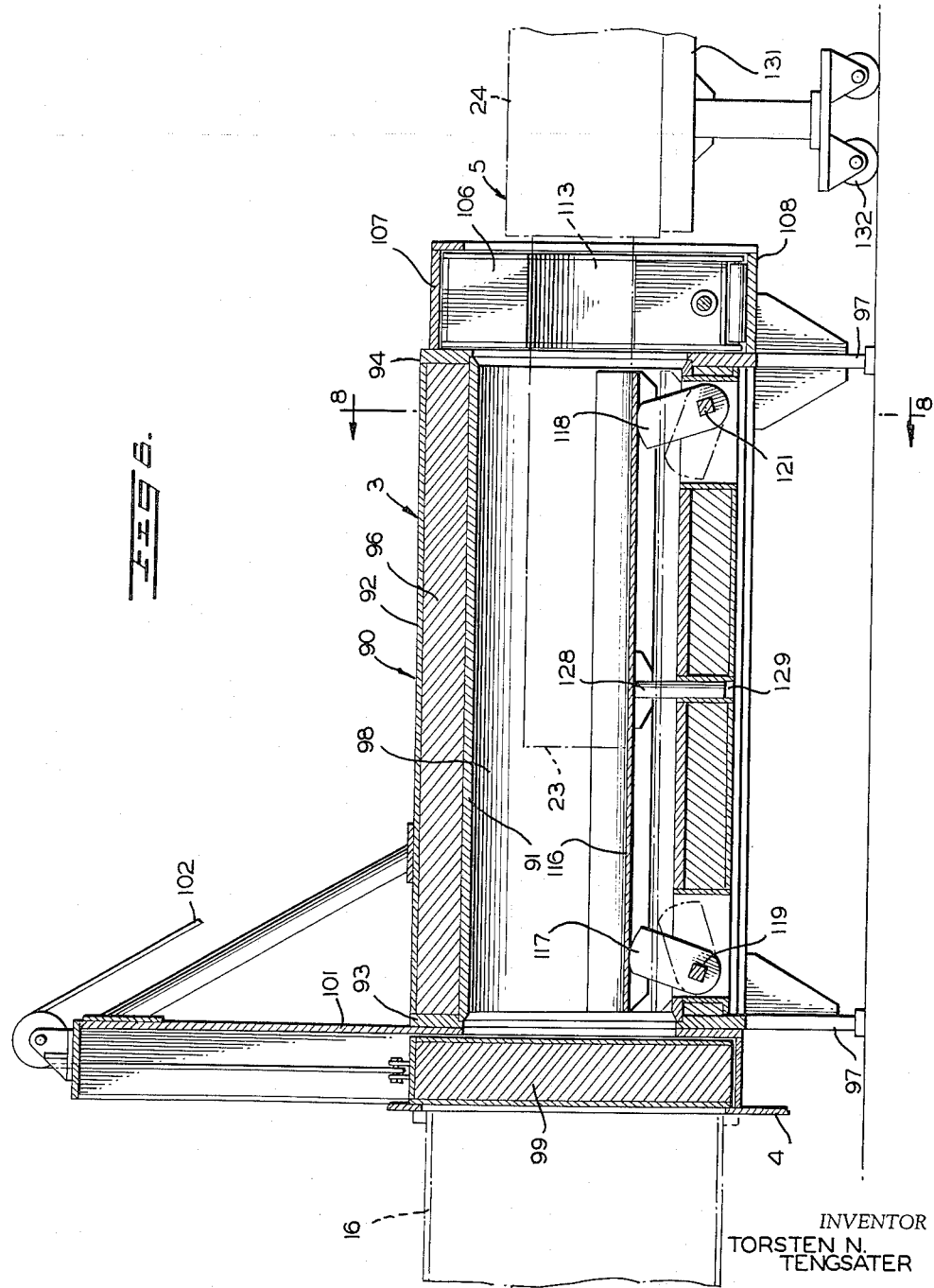

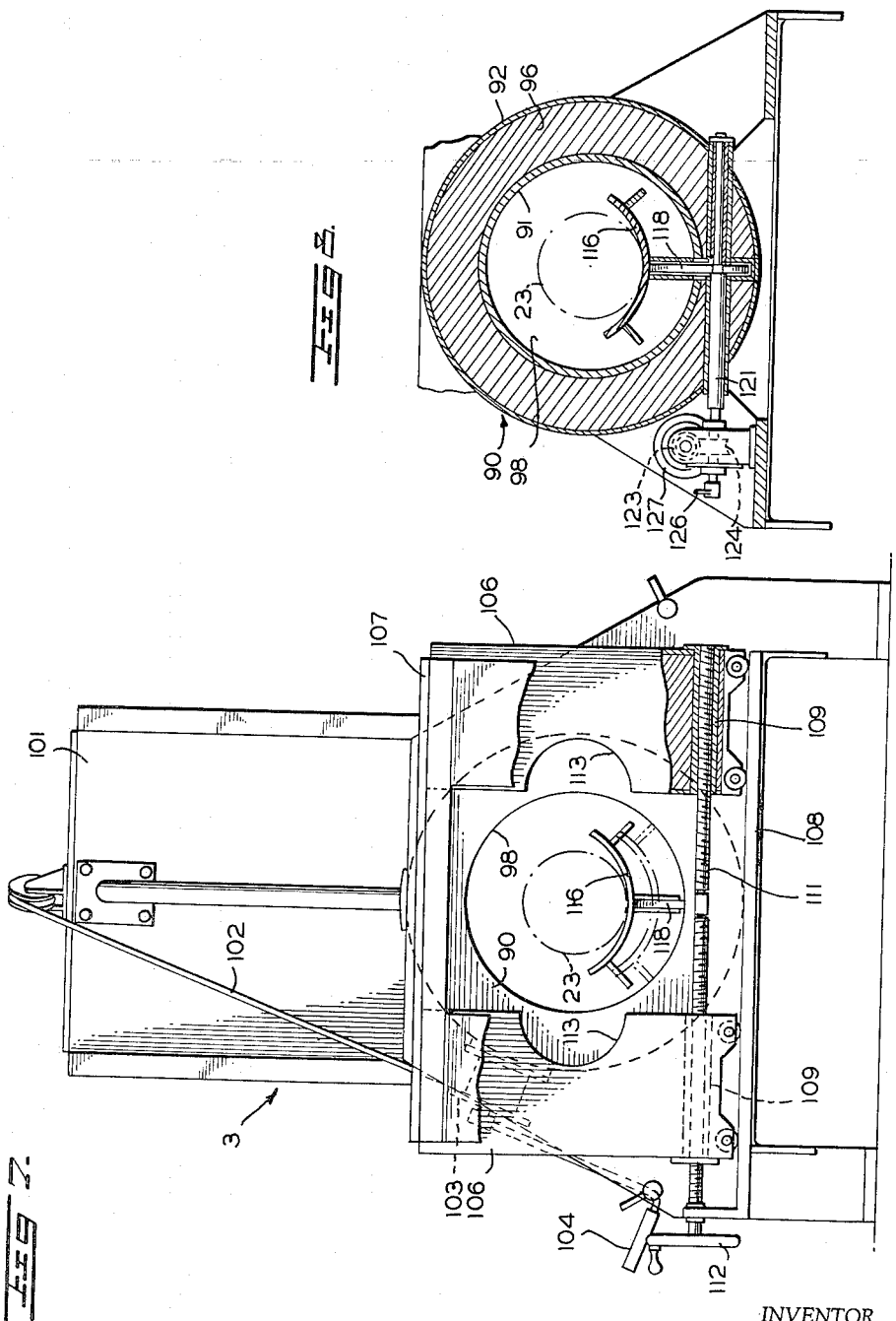

United States Patent Office 3,028,328
Patented Apr. 3, 1962

3,028,328
NUCLEAR REACTOR EXPERIMENTAL FACILITY
Torsten N. Tengsater, Arlington, Va., assignor, by mesne assignments, to Allis-Chalmers Manufacturing Company, a corporation of Delaware
Filed Apr. 4, 1958, Ser. No. 726,451
7 Claims. (Cl. 204—193.2)

This invention relates to nuclear reactor experimental facilities and, more particularly, to port plugs for closing port openings and to methods and apparatus for moving plugs into and out port openings.

For the purpose of exposing samples to irradiation, nuclear reactors are provided with ports leading through a biological shield, a thermal shield, and a reflector into or adjacent a fuel element core tank. The ports are normally closed by plugs comprising a front section integral with a back section, the front section of some types of plugs having a chamber adapted to receive an encapsulated sample. To cool the chamber and sample therein, cooling fluid is circulated through the plug and sample chamber from a suitable source exterior of the reactor.

To facilitate fabrication and handling of relatively long, heavy port plugs, the present invention contemplates the provision of a port plug comprising detachably connected front and back sections provided with means for circulating cooling fluid therethrough.

An object of the invention is to provide a port plug comprising front and back sections, and means operable from a position exterior of the reactor for detachably securing the two sections together.

Another object of the invention resides in the provision of conduits for circulating a cooling medium through detachably connected front and back sections of a port plug, and valve means in said conduits adapted to close automatically responsive to axial movement of the plug sections away from each other to prevent the escape of the cooling medium from the system during disengagement and removal of the individual plug sections from a reactor port.

Another object of the invention resides in the provision of a method and apparatus for moving sectional port plugs into and out of reactor ports.

A further object of the invention is to provide a flask structure adapted to facilitate the transfer of port plug sections between reactor ports and storage racks.

Another object is to provide an adjustable flask structure adapted to accommodate port plugs of different diameters.

The invention embodies other novel features, details of construction and arrangement of parts which are hereinafter set forth in the specification and claims and illustrated in the accompanying drawings, forming part thereof, wherein:

FIG. 1 is a fragmentary vertical section illustrating a nuclear reactor provided with a port plug embodying features of the invention.

FIG. 2 is an enlarged longitudinal section showing the inner section of the port plug.

FIG. 3 is an enlarged longitudinal section showing the outer section of the port plug.

FIG. 4 is a section, partly in side elevation, illustrating the pipe coupling elements and the valves therein.

FIG. 5 is a top plan view illustrating a flask particularly adapted for use in handling sectional port plugs.

FIG. 6 is a longitudinal section taken along the line 6—6 of FIG. 5.

FIG. 7 is an end elevation of the flask.

FIG. 8 is a transverse section taken along the line 8—8 of FIG. 6.

Referring now to the drawings for a better understanding of the invention and more particularly to FIG. 1 therein, a conventional nuclear reactor 4 is shown as comprising a tank 6 adapted to contain a conventional reactor core and a heavy water moderator and coolant therefor, a graphite reflector 8, a thermal shield 9, and a concrete biological shield 10. The thermal shield 9 comprises a layer of lead 11 interposed between steel sheets 12 and 13, the inner steel sheet 12 having a boral facing or coating 14.

The shield 10 is formed with a recess or box 15 communicating with a plug port 16 which extends horizontally from the inner face of the box to the inner face of the reflector 8 and is lined with an inner sleeve 17 and an outer sleeve 18. A shutter opening 19 is provided in the shield 10 between adjacent ends of the sleeves 17 and 18 to receive a conventional shutter 21 adapted to be lowered through the opening to close the plug port 16 when a plug 22 is removed therefrom.

The port plug 5 is shown as comprising an inner section 23 and an outer section 24 secured together in axial alignment, the outer section being of larger diameter than the inner section to provide an annular shoulder to block off radiation from the reactor core. As shown in FIG. 2, the inner section 23 of the port plug comprises a cylindrical outer wall 26 formed from a length of aluminum pipe and closed at its ends by a female aluminum coupling member 27 and an aluminum front wall 28. A boral plate 29 is disposed against the back face of the front wall 28, and a lead wall 30 is provided between the boral plate and the coupling member 27. The coupling member 27 and front wall 28 are secured to the ends of the outer wall 26 by weld joints 31.

A housing 32, provided on the front end of the inner plug section 23 to receive samples to be tested, is shown as comprising a tubular aluminum shell 33 closed at one end thereof by the front wall 28 and at its other end by an aluminum cap 34. A portion of the front wall 28 is telescopically engaged within the shell 33 and secured thereby by means of either a weld joint or screws 37, depending upon the size of the port plug. The cap 34 is secured to the shell by screws 38.

Inlet and outlet stainless steel conduits 39 and 41 extend along helical paths through the inner plug section 23 into the sample housing 32 and provided with union pipe fittings 42 for detachable connection to fluid inlet and outlet pipes provided on a sample container 43 for the circulation of cooling fluid therethrough. Identical female pipe couplers 44—44 are threaded into the coupling member 27 and provided with valves 46—46 to control the flow of fluid through their respective conduits 39 and 41, each valve being biased toward its closed position by a compression spring 47, as shown in FIG. 4.

The coupling member 27 is formed with a coupling recess 48 having concentric inner and outer cylindrical surfaces 49 and 51 merging with a frusto-conical surface 52. The member 27 is also formed with a threaded opening 53 and an alignment aperture 54.

The outer plug section 24 comprises a cylindrical aluminum wall 56 closed at one end thereof by an aluminum male coupling member 57 and at its other end by an aluminum back wall 58, said member and back wall being secured to said wall by weld joints 59. A tubular member 61 of stainless steel extends axially through the plug section 24, and a pair of stainless steel fluid conduits 62 and 63 extend along helical paths through the plug section. The interior of the plug section is filled with concrete 64 which is inserted in a semi-fluid condition through an opening provided in the back wall 58. Sets of rollers 66 are provided on the wall 56 of the plug section 24 to support the latter for sliding axial movement through a reactor plug port 16.

The male coupling member 57 is formed with a boss 67 having concentric cylindrical outer surfaces 68 and 69 which merge with a frusto-conical outer surface 71, said surfaces being formed to engage surfaces 49, 51 and 52, respectively, on the coupling member 27. A pair of male pipe couplers 72—72 are threaded into the coupler member 57, within a recess 73 formed in the boss 67, and provided with valves 74 to control the flow of liquid through their respective conduits 62 and 63. Each valve 74 is biased toward its closed position by a compression spring 76. The pipe couplers 72—72 are telescopically engageable within their companion pipe couplers 44—44, and the latter are provided with O-ring gaskets 77 to prevent leakage after companion couplers are coupled together. Union pipe fittings 78—78 are provided on the outer ends of their respective conduits 62 and 63 and connected to fluid inlet and outlet pipes 79 and 81 leading to a fluid source and reservoir, respectively. An alignment pin 82 is mounted on the coupling member 57 for engagement in the alignment aperture 54 formed in the coupling member 27 of the inner plug section 23. The back wall 58 is formed with a threaded aperture 83 to receive a draw bar 84.

The inner plug section 23 and the outer plug section 24 are adapted to be drawn together or urged apart by means of a screw 86 which extends through the tubular member 61 for threaded engagement in the threaded aperture 53 in the coupling member 27. To prevent axial movement of the screw relative to the plug section 24, a collar 87 is fixed on the screw for abutting engagement with the outer wall 58 and a thrust plate 88 secured thereto by screws 89.

FIGS. 5 through 8 illustrate a flask 3 particularly adapted for use in handling port plugs 5 of the type heretofore shown and described. The flask comprises a body 90 formed by concentric inner and outer cylindrical aluminum walls 91 and 92 joined at their ends to aluminum end rings 93 and 94 to define an annular chamber which is filled with lead 96. The flask body is supported upon suitable legs 97 to dispose the opening 98 in the body in axial alignment with the plug port 16 in the reactor.

A lead filled shutter 99 of guillotine type is guided for vertical movement in a guide structure 101 secured to the front end of the body 90, the shutter being raised or lowered by means of a cable 102 and a self locking winch 103 which is mounted on the body 90 and manually actuated by a crank 104.

A pair of lead filled shutter sections 106—106 are provided on the back end of the flask body 90 and are guided for horizontal movement transversely of the opening 98 by upper and lower guide rails 107 and 108, respectively. The shutter sections are provided with nuts 109—109 to receive the reversely threaded ends of an actuating screw 111 having a handwheel 112 thereon, whereby the shutter sections may be moved toward or away from each other, responsive to rotation of the screw. Semi-cylindrical recesses 113—113 are provided in the shutter sections to define a cylindrical opening when the sections are toward each other into abutting engagement, said cylindrical opening having a diameter substantially corresponding to the diameter of the largest size inner plug section 23 to be clamped between the shutter sections. To engage inner plug sections of smaller diameters, suitable inserts or adapters may be mounted in their respective recesses 113—113.

A vertically movable platform 116 is provided within the opening 98 in the flask body 90 to support the plug sections 23 and 24 being moved into or out of the reactor ports. The platform is moveable between an upper position and a lower position by means of cams 117 and 118 fixed on cam shafts 119 and 121, respectively. The shafts 119 and 121 are interconnected to raise or lower the platform 116 by means of a drive shaft 122 having reversely threaded worms 123—123 on opposite ends thereof for meshing engagement with companion worm gears 124—124 fixed on their respective cam shafts 119 and 121. Pointers 126—126 are provided on the ends of their respective shafts 119—121 to indicate the position of the platform within the flask opening 98. The drive shaft 122 is manually rotated by means of a handwheel 127 fixed thereon. The platform is guided for vertical movement by means of a guide pin 128 mounted thereon for sliding engagement in a guide bushing 129 mounted on the flask body 90. To accommodate port plugs of relatively smaller diameters, the platform 116 may readily be replaced by a platform of different size.

To remove the port plug 5 from the port 16 in the nuclear reactor 4, the flask 3 is first moved by a suitable fork lift truck into position against the outer face of the reactor to dispose the flask opening 98 in alignment with the port and plug. A vertically adjustable table 131 mounted on wheels 132 is then positioned back of the flask, as illustrated in FIG. 6. The handwheel 127 is rotated to move the platform 116 from its raised position to its lower position, indicated in dot and dash outline in FIGS. 6 and 7. The shutter 99 is then raised to its open position by means of the winch 103; and the shutters 106—106 are moved apart to open position by means of the handwheel 112.

The draw bar 84 is then inserted through the flask opening 98 and threaded into the threaded aperture 83 in the outer plug section 22. By pulling on the draw bar 84, the plug 5 is manually drawn from the port 16 into and partly through the opening 98 in the flask to the position indicated in dot-dash outline in FIG. 6, wherein the outer plug section 24 rests upon the table 131. The reactor shutter 21 and the flask shutter 99 are then closed; the platform 116 is raised into engagement under the inner plug section 23; and the shutter sections 106—106 are moved toward each other to clamp the inner plug section therebetween.

The outer plug section 24 is then uncoupled from the inner plug section 23 by rotating the screw 86. During uncoupling movement of the plug sections, the valves 46 and 74 are moved to their closed position by their respective springs 47 and 76 to prevent the escape of cooling fluid from the plug section conduits.

Loading of a plug 5 into a reactor port 16 merely involves reversing the procedure heretofore described in removing the plug.

Having described a preferred embodiment of the present invention, it is to be understood that although specific terms and examples are employed, they are used in a generic and descriptive sense and not for purposes of limitation; the scope of the invention being set forth in the following claims.

What is claimed is:

1. A nuclear reactor port plug comprising an axially inner section including a sample chamber, an axially outer plug section affording biological shielding, coupling means detachably interconnecting said plug sections in axial alignment, said coupling means comprising telescopically engaged members provided on their respective plug sections, a screw extending longitudinally through said outer plug section and in threaded engagement with said inner plug section, one of said sections being axially movable relative to said other section in response to rotation of said screw to selectively draw together or urge apart said sections, each plug section having inlet and outlet conduits, and telescopically engaged pipe coupling elements on their respective sections interconnecting the conduits of one plug section with the conduits of the other plug sections responsive to axial movement of one section toward the other section.

2. A nuclear reactor port plug comprising an axially inner section including a sample chamber, an axially outer plug section affording biological shielding, coupling means detachably interconnecting said plug sections in axial alignment, said coupling means comprising telescopically engaged members provided on their respective plug sections, a screw extending longitudinally through said outer plug section and in threaded engagement with said inner plug section, one of said sections being axially movable relative to said other section in response to rotation of said screw to selectively draw together or urge apart said sections, each plug section having inlet and outlet conduits, pipe coupling elements on their respective sections interconnecting the conduits of one plug section with the conduits of the other plug section responsive to axial movement of one section toward the other section, related pipe coupling elements having valves therein movable from closed to open positions responsive to abutting engagement against each other during coupling engagement of the plug sections.

3. A nuclear reactor port plug comprising an axially inner section including a sample chamber, an axially outer plug section affording biological shielding, coupling means detachably interconnecting said plug sections in axial alignment, said coupling means comprising telescopically engaged members provided on their respective plug sections, a screw extending longitudinally through said outer plug section and in threaded engagement with said inner plug section, one of said sections being axially movable relative to said other section in response to rotation of said screw to selectively draw together or urge apart said sections, each plug section having inlet and outlet conduits, pipe coupling elements on their respective sections interconnecting the conduits of one plug section with the conduits of the other plug section responsive to axial movement of one section toward the other section, related coupling elements having valves therein movable from closed to open positions responsive to abutting engagement against each other during coupling engagement of the plug sections, and resilient means yieldably resisting opening movement of said valves.

4. A nuclear reactor port plug comprising inner and outer plug sections, coupling means detachably interconnecting said plug sections in axial alignment, said coupling means comprising telescopically engaged members provided on their respective plug sections, a screw extending longitudinally through said outer plug section and in threaded engagement with said inner plug section, each plug section having inlet and outlet conduits, pipe coupling elements on their respective sections interconnecting the conduits of one plug section with the conduits of the other plug element responsive to axial movement of one section toward the other section, related coupling elements having valves therein movable from closed to open positions responsive to abutting engagement against each other during coupling engagement of the plug sections, and means on said outer section engaging said screw against axial movement relative thereto, whereby said inner plug section is movable axially of the outer plug section by said screw during engagement and disengagement of the sections.

5. A nuclear reactor port plug comprising inner and outer plug sections, coupling means detachably interconnecting said plug sections in axial alignment, said coupling means comprising telescopically engaged members provided on their respective plug sections, a screw extending longitudinally through said outer plug section and in threaded engagement with said inner plug section, each plug section having inlet and outlet conduits, pipe coupling elements on their respective sections interconnecting the conduits of one plug section with the conduits of the other plug section responsive to axial movement of one section toward the other section, related coupling elements having valves therein movable from closed to open positions responsive to abutting engagement against each other during coupling engagement of the plug sections, and means on said outer section engaging said screw against axial movement relative thereto, whereby said inner plug section is movable axially of the outer plug section by said screw during engagement and disengagement of the section, one of said members having axially spaced cylindrical surfaces snugly slidably engaging axially spaced cylindrical surfaces on the other of said members during engagement and disengagement of the plug sections.

6. A nuclear reactor port plug comprising inner and outer plug sections, coupling means detachably interconnecting said plug sections in axial alignment, said coupling means comprising telescopically engaged members provided on their respective plug sections, a screw extending longitudinally through said outer plug section and in threaded engagement with said inner plug section, each plug section having inlet and outlet conduits, pipe coupling elements on their respective sections interconnecting the conduits of one plug section with the conduits of the other plug section responsive to axial movement of one section toward the other section, related coupling elements having valves therein movable from closed to open positions responsive to abutting engagement against each other during coupling engagement of the plug sections, means on said outer section engaging said screw against axial movement relative thereto, whereby said inner plug section is movable axially of the outer plug section by said screw during engagement and disengagement of the sections, one of said members having axially spaced cylindrical surfaces snugly slidably engaging axially spaced cylindrical surfaces on the other of said members during engagement and disengagement of the plug sections, and alignment means on said plug sections to arrange related coupling members in axial alignment during engagement and disengagement of the plug sections.

7. A nuclear reactor port plug comprising inner and outer plug sections, coupling means detachably interconnecting said plug sections in axial alignment, said coupling means comprising telescopically engaged members provided on their respective plug sections, a screw extending longitudinally through said outer plug section and in threaded engagement with said inner plug section, each plug section having inlet and outlet conduits, pipe coupling elements on their respective sections interconnecting the conduits of one plug section with the conduits of the other plug section responsive to axial movement of one section toward the other section, related coupling elements having valves therein movable from closed to open positions responsive to abutting engagement against each other during coupling engagement of the plug sections, and a sample housing enclosed within the inner plug section and connected to the inlet and outlet conduits in the inner plug section.

References Cited in the file of this patent
UNITED STATES PATENTS

| | | |
|---|---|---|
| 1,365,415 | Lawrence | Jan. 11, 1921 |
| 1,951,645 | Boosey | Mar. 20, 1934 |
| 1,988,223 | Voss | Jan. 15, 1935 |
| 2,514,909 | Strickland | July 11, 1950 |
| 2,548,528 | Hansen | Apr. 10, 1951 |
| 2,594,970 | Monk | Apr. 29, 1952 |
| 2,719,823 | Zinn | Oct. 4, 1955 |
| 2,750,517 | Baum | June 12, 1956 |
| 2,772,361 | Hiestand | Nov. 27, 1956 |
| 2,826,883 | Pollmann | Mar. 18, 1958 |
| 2,828,875 | Ginns | Apr. 1, 1958 |
| 2,836,729 | Snarr | May 27, 1958 |
| 2,842,923 | Kjellsen | July 15, 1958 |
| 2,874,107 | Ohlinger et al. | Feb. 17, 1959 |